Figure 1:
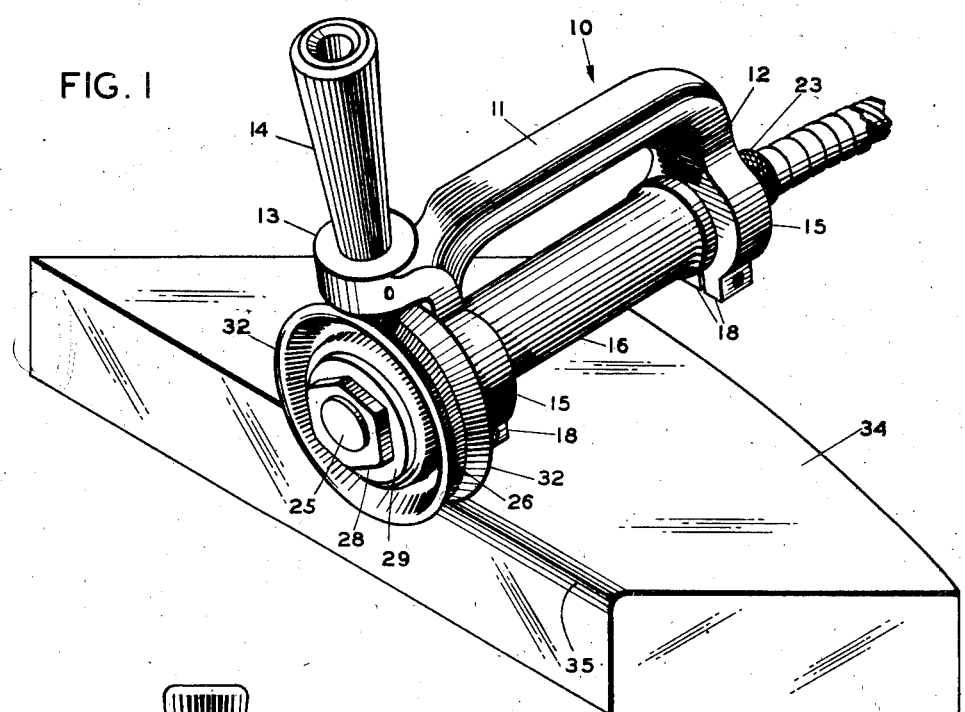

Dec. 16, 1947.        H. McM. GRIFFIN        2,432,753
FORMING AND SHAPING TOOL
Filed May 6, 1944

INVENTOR
HARRY McMURTRY GRIFFIN
BY
ATTORNEY

Patented Dec. 16, 1947

2,432,753

UNITED STATES PATENT OFFICE 2,432,753

FORMING AND SHAPING TOOL

Harry McMurtry Griffin, Webster Groves, Mo., assignor to Curtiss-Wright Corporation, a corporation of Delaware Application May 6, 1944, Serial No. 534,482

4 Claims. (Cl. 90—12)

This invention relates generally to abrading or cutting tools and is particualrly concerned with improvements in the arrangement of parts of such tools to render the same more useful in the shaping of form blocks, die blocks and similar forming means.

It is well known in the art to use form blocks, dies and the like in the manufacture and fabrication of sheet materials whether the forming thereof is accomplished by hand or machine methods. The forming of sheet-like material requires a considerable degree of accuracy in its fabrication since the mass production methods prevailing dictate that each unit of a series of similar parts be rendered as nearly interchangeable with other such units as it is possible to achieve. This is especially true in the fabrication of parts used in the construction of airplanes, automobiles and a great number of other articles of manufacture such as are found in home appliances and the like.

In forming sheet material it is necessary to provide the forming dies and blocks with smooth, accurate and uniformly shaped margins conforming to the desired radius, bevel or other marginal contour desired for the finished object or part. At the present time a large amount of time is spent in hand forming and shaping operations on such form blocks with the result that the finished work usually lacks the required degree of uniformity and accuracy to meet the exacting conditions for interchangeable parts.

Accordingly this invention has as one of its principal objects the provision of a forming or shaping tool which shall overcome the noted objections prevailing in the present hand forming operations performed on dies, form blocks and the like where the same are used in the fabrication of sheet-like materials.

It is also an object to provide a power operated device or tool which shall be fully capable of performing uniform and accurate shaping and cutting operations on dies and form blocks.

Another object is the provision of a forming or shaping tool for carrying out the above objects in a rapid and efficient manner, with a minimum amount of skill required on the part of the workman.

Still a further object resides in the provision in a forming or shaping tool of a rotary abrading or cutting wheel having a working surface conforming with the shape or form desired and wheel guiding elements cooperating with the cutting wheel whereby the desired degree of accuracy and uniform workmanship may result.

Figure 2:
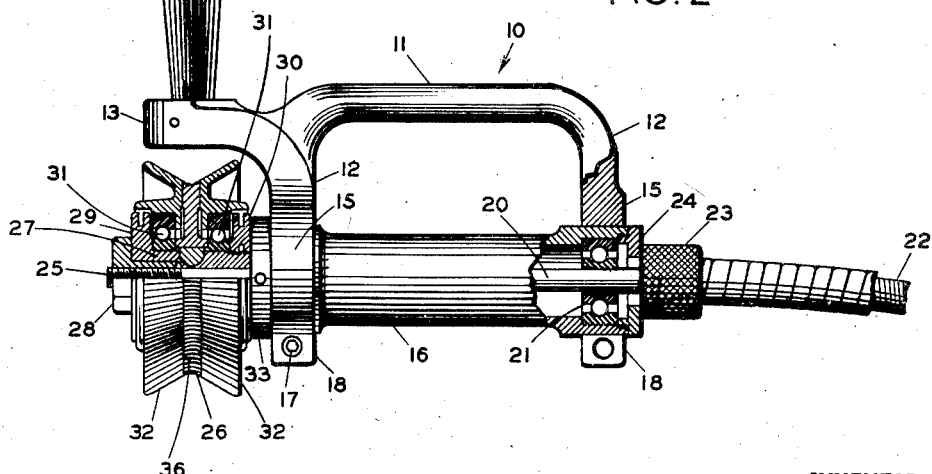

These and other objects will be further noted in the description of a preferred embodiment of this invention as illustrated in the accompanying drawing, in which:

Fig. 1 is a perspective view of the forming or shaping tool shown in operative position relative to a form block; and Fig. 2 is a side elevational view of the tool, certain detail portions of which have been further shown in broken section.

In the drawing the shaping tool is indicated as including a frame structure 10 having a handle or gripping portion 11, spaced depending arm portions 12 and a forwardly extending portion 13 to which there has been attached in a convenient manner an upstanding handle or second gripping means 14 whereby and in conjunction with the grip 11 the manual manipulation of the tool is greatly facilitated as will be explained presently in connection with the method of using the tool.

Each of the frame arms 12 is formed with a flattened and circularly formed end portion 15 having a large aperture therein, and each portion 15 is further characterized as being of split type so that a housing 16 may be securely clamped in position and extend through each of the apertures, the apertures being axially aligned for that purpose. The split end portions 15 are drawn up about the housing by bolts 17 threaded into suitable boss formations 18 at the outer end of each arm in a well known manner.

The housing 16, clamped in the frame as described, receives in its hollow interior a shaft 20 which is rotatably mounted in bearings 21 positioned in the open end portions of the housing. Since each such bearing organization is substantially similar, only the rear one thereof has been shown in connection with the provisions for coupling a flexible type power shaft to the adjacent end of the shaft 20. The power shaft 22, enclosed in a flexible casing, is secured in driving relation with the shaft 20 through a well known type of slotted male and female coupling (not shown), and the coupling is held from axial separation by a knurled cap 23 threaded over the end of a suitable bearing retainer element 24, the latter element being threadedly mounted in the end of the housing where it may act to secure the bearing 21 in a bearing recess as shown. The opposite end of shaft 20 projects forwardly of the housing to lie below the frame portion 13 as at 25.

The means utilized in forming and shaping the die or form block is mounted on the shaft projection 25 and comprises a disc or wheel element 26 suitably keyed to a sleeve member 27 which is press-fitted on the shaft portion 25 and secured against unintended displacement by a sleeve type lock nut 28 threaded onto the outer end of the shaft and positioned in an axial recess in the sleeve 27 as shown in Fig. 2. The wheel mounting sleeve 27 is provided with an integral flange 29 at its outer end and a removable threaded flange 30 at its inner end whereby the inner races of a pair of bearings 31 may be retained in spaced relation by the hub portion of the wheel 26. The inner bearing races and wheel are axially compressed between the flanges 29 and 30 thereby constituting a single rotating unit. The complete unit also includes a pair of wheel guides 32 positioned at each side of the wheel but freely rotatably mounted with respect thereto upon the outer race elements of the bearings 31. In this manner the guides 32 may or may not rotate with the wheel, depending upon the frictional face contact occurring therebetween due to a slight amount of axial play allowed in the bearings 31. In assembly the sleeve 27 is spaced from a backing plate 33 carried on housing 16 with sufficient working clearance to prevent excessive rubbing contact therebetween as will be understood by those skilled in the methods of assembly of such parts.

In the drawing the disc or cutting wheel 26 is shown in Fig. 1 as of a type adapted for shaping a radius contour on the margins of a form block, the block being shown generally at 34 with a partially completed radius formed on a margin as indicated at 35. The shaping wheel periphery is illustrated as being of arcuate concavity with sufficient curvature to produce a smooth and accurate radius edge on the finished block. The guiding elements 32 positioned to embrace the wheel 26 are provided with generally smooth peripheral work contacting faces of conic formation such that each thereof converges toward and merges with the peripheral margins of the wheel. Hence, the resulting peripheral profile of these guides and interposed wheel is substantially similar or in general conformity with the radius contour desired for the form block margins, but because of greater accuracy of results is made to include a somewhat greater angle than is formed at the margins between adjacent planes of intersection of the form block. The included angle between the conic peripheral faces of the guides is generally a matter of preference and skill of the workman using this shaping tool, but in the tool shown may be approximately of the order of 110–120 degrees of arc for form block marginal angles of 90 degrees, more or less.

The shaping wheel 26 is provided with peripheral cutting surfaces or teeth 36 having suitable rake and shear angles chosen to facilitate chip clearance for high speed cutting action, while the tooth fineness may be varied depending upon the amount of material to be removed, the character of the material being worked and the degree of finish required. The reference to cutting teeth 36 on the shaper wheel or disc 26 may also be taken to include a suitably roughened surface or a surface of the character of abrading tools, such as files and the like.

In use, an electric motor or other power source (not shown) rotates the flexible shaft 22 and in turn the shaft 20 and shaper wheel 26 carried thereby. The flexible shaft permits adequate freedom of movement for the tool so that it may be manipulated freely by the gripping handles 11 and 14 as desired. It will be noted that the frame portion 13 overlying the shaper wheel acts as a guard therefor and prevents accidental contact with the wheel should a workman's hand slip from the handle 14. In Fig. 1 the tool is illustrated in its radius cutting position on the margin 35 of a form block 34 where, by a combined lateral rocking motion and longitudinal movement of the tool a uniform and accurate radius contour results. In the course of rocking the tool where the cutter wheel is moved laterally across the form block margin 35 in a rolling manner, the guides alternately contact the adjacent planar faces of the form block and effectively prevent the cutting face from entering or gouging the work beyond the marginal zone of the finally formed edge. It can be seen that this arrangement of convergent or conic guides aids in producing accurate and uniform work. A further advantage to be obtained by providing cutter wheel guides of a non-driven type is that the tool may be more accurately guided and steadied, especially while blending the marginal contour into the face planes of the block, since the effect of the wheel rotation is to cause the tool to creep or run along the block margin unless forcibly resisted. The free rolling of the guides therefore tends to lessen this creeping tendency of the shaping wheel at the critical zone of the work by surface contact with the form block.

With the foregoing description of a preferred embodiment in mind it may be well understood that other shaped cutting wheels and wheel guides can be substituted for that disclosed in order that the tool may serve many useful forming operations where other than radius contours are desired. Obviously there are certain changes which may be made in the form and arrangement of parts of the present shaping tool without in any way departing from the spirit and intended scope of the claims appearing below.

What is claimed is:

1. In a tool for shaping the margins of a form block, the combination of a frame, a housing carried by said frame, a shaft rotatably mounted in said housing and having one end projecting therefrom, a peripherally toothed shaping wheel mounted on said shaft projection to rotate therewith, shaping wheel guide means positioned at each side of said wheel and mounted on said shaft projection for rotation relative thereto, said guide means having oppositely directed peripheral faces convergent toward said shaping wheel such that the profile configuration of said shaping wheel and guide means conforms substantially with the final shape of the form block margins and means for rotating said shaft and shaping wheel.

2. In a tool for shaping the margins of a form block, the combination of a frame having gripping means for facilitating manual manipulation thereof while in use, a housing carried by said frame, a shaft rotatably mounted in said housing and having one end projecting therefrom, a peripherally toothed shaping wheel fixed to said shaft projection, shaping wheel guides freely rotatably carried on said shaft at each side of said wheel, said wheel guides having oppositely directed peripheral faces converging toward said shaping wheel periphery to form with said wheel periphery a profile configuration substantially similar to the marginal formation desired on the form block and a flexible power shaft connected to said shaft for rotating the same.

3. In a tool for shaping the margins of a form block, the combination of a frame structure provided with gripping means to facilitate manual manipulation thereof while in use, a housing carried by said frame structure, a shaft rotatably mounted in said housing with one end projecting therefrom, a peripherally toothed shaping wheel fixed to said shaft projection, shaping wheel guides freely rotatably mounted on said shaft to embrace said shaping wheel, said guides having peripheral faces converging toward said shaping wheel periphery to form with said wheel periphery a profile configuration substantially similar to the marginal formation desired on the form block, said frame structure also having a portion thereof projecting in overhanging relation with said shaping wheel to constitute a guard therefor and a power shaft connected to said shaft for rotating the same.

4. In a forming tool, a pair of axially spaced guide wheels and a cutting wheel disposed therebetween, said guide wheels being in coaxial relation with the cutting wheel and mounted for independent rotation relative thereto, said guide wheels having angularly related peripheral guide faces for limiting engagement with a workpiece and the cutting wheel having a grooved cutting face substantially curved in profile for rounding an edge of the workpiece, said guide faces and cutting face together defining a peripheral groove whose profile is substantially in the shape of a shallow V with rounded apex, the profile of said cutting face defining said rounded apex of the V, and means for rotating said cutting wheel.

HARRY McMURTRY GRIFFIN.

REFERENCES CITED

The following references are of record in the file of this patent:

UNITED STATES PATENTS

| Number | Name | Date |
|---|---|---|
| 692,028 | Page | Jan. 28, 1902 |
| 1,359,288 | Swain et al. | Nov. 16, 1920 |
| 2,021,442 | Capomacchio et al. | Nov. 19, 1935 |
| 399,153 | Nobel | Mar. 5, 1889 |
| 1,415,048 | Patigian | May 9, 1922 |

FOREIGN PATENTS

| Number | Country | Date |
|---|---|---|
| 12,430 | Great Britain | 1889 |
| 674,568 | France | Jan. 30, 1930 |